United States Patent [19]
Easter

[11] Patent Number: 5,460,354
[45] Date of Patent: Oct. 24, 1995

[54] CLAMP ASSEMBLY FOR AIR SPRING

[75] Inventor: Mark R. Easter, Indianapolis, Ind.

[73] Assignee: Bridgestone/Firestone, Inc., Akron, Ohio

[21] Appl. No.: 265,283

[22] Filed: Jun. 24, 1994

[51] Int. Cl.⁶ ....................................................... F16F 9/54
[52] U.S. Cl. .................. 267/64.27; 188/322.12; 188/322.16
[58] Field of Search .................. 188/322.12, 322.16, 188/322.19; 267/64.19, 64.23, 64.27, 122, 129; 277/212 C, 212 FB, 212 R

[56] References Cited

U.S. PATENT DOCUMENTS

| | | | |
|---|---|---|---|
| 2,149,040 | 2/1939 | Binder et al. | 188/298 |
| 3,391,922 | 7/1968 | Axthammer | 267/64.23 |
| 3,819,166 | 6/1974 | Ellis et al. | 267/64.21 |
| 4,067,558 | 1/1978 | Keijzer et al. | 267/64.19 |
| 4,378,935 | 4/1983 | Brown et al. | 267/64.27 |
| 4,564,177 | 1/1986 | Leonard | 267/64.24 |
| 4,784,376 | 11/1988 | Ecktman | 267/64.27 |
| 4,787,606 | 11/1988 | Geno | 267/64.27 |
| 4,852,861 | 8/1989 | Harris | 267/64.27 |
| 4,899,995 | 2/1990 | Hoffman et al. | 267/64.27 |
| 4,946,144 | 8/1990 | Geno et al. | 267/64.27 |
| 5,005,808 | 4/1991 | Warmuth et al. | 267/64.27 |
| 5,127,641 | 7/1992 | Schneider | 267/64.27 |
| 5,374,037 | 12/1994 | Bledsoe | 267/64.27 |

Primary Examiner—Robert J. Oberleitner
Assistant Examiner—Chris Schwartz
Attorney, Agent, or Firm—Carmen Santa Maria

[57] ABSTRACT

A clamp assembly includes an annular clamping member for clamping an open end of an elastomeric sleeve of an air spring of a suspension system in a fluid tight relationship with a sealing surface of an end member of the air spring. An annular concave recess is formed in either the end member or clamping member and is in radial alignment with a convex projection formed on the other of the end member or clamping member. The concave recess has an axial length at least equal to or greater than the axial length of the convex projection but not as deep as the height of the convex projection. This provides a pair of pinch areas on opposite sides of the radially aligned centers of concavity of said recess and apex of the projection to sealingly secure the sleeve therebetween without excess squeezing of the sleeve at the radially aligned centers of the recess and projection. The radius of curvature of the convex projection is greater than the radius of curvature of the concave recess by an amount less than the thickness of the elastomeric sleeve.

16 Claims, 3 Drawing Sheets

CLAMP ASSEMBLY FOR AIR SPRING

BACKGROUND OF THE INVENTION

1. Technical Field

The invention relates to clamping means and more particularly to a clamp assembly adapted to affix a resilient elastomeric sleeve member to a metal wall of a suspension system or to an end cap of an air spring. Specifically, the invention relates to a clamp assembly employing a clamping member having a radially extending convex projection which coacts with a corresponding concave recess wherein the projection has a different radius of curvature than that of the recess so as to provide a pair of pinch areas on opposite sides of the radially aligned centers of the recess and projection, whereby the rubber is squeezed outwardly so the clamping load does not act directly on the member being crimped to prevent it from being crushed.

2. Background Information

Pneumatic springs commonly referred to as air springs, have been used for many applications, including motor vehicles, for a number of years to provide cushioning between movable parts of the vehicle, primarily to absorb shock loads impressed on the vehicle axles by the wheels striking an object in the road or falling into a depression. The air spring usually consists of a flexible elastomeric sleeve or bellows containing a supply of compressible fluid and has one or more pistons movable with respect to the flexible sleeve. The piston causes compression and expansion of the fluid within the sleeve as the sleeve compresses and expands as the vehicle experiences the road shock. The spring sleeve is formed of a flexible elastomeric material containing reinforcing cords, and permits the piston to move axially with respect to another piston or end cap secured within open ends of the sleeve.

The open ends of the elastomeric sleeves are sealingly connected to the piston and/or opposite end cap, and the integrity of this connection is always one of the important and major aspects in producing an efficient and maintenance-free air spring. One problem that can occur with air springs, and in particular, the clamp ring therefor, is that the clamp ring will move in its clamped position under dynamic air spring conditions causing movement of the clamped elastomeric material therebetween tending to loosen the sealing engagement and deteriorating the clamp integrity and causing ultimate air spring leakage and failure. This ring movement is especially critical during the jounce or collapsing stroke.

Another problem that can occur with air springs and the clamping of the elastomeric sleeve ends to the piston member, end cap or other component of a suspension system, is to secure a sufficiently tight seal to enable the air spring to withstand high fluid pressures in the fluid chamber without premature leakage or bursting even upon experiencing severe air spring movement and being exposed to the harsh environments on the undercarriage of a vehicle.

Air springs are also used in combination with other types of suspension systems, such as those incorporating shock absorbers. Examples of such composite suspension systems are shown in U.S. Pat. Nos. 2,149,040 and 3,819,166.

Although these prior art clamping members provide satisfactory fluid-type seals with the end member of the air spring, the seal is usually obtained by applying a large force on the clamping ring to swage it into an extremely tight clamping fit against the air spring end member in order to squeeze and crimp the material of the elastomeric sleeve therebetween. It is difficult to utilize such a clamp ring and current method of crimping where the member with which the clamp ring is utilized is of a thin metal, such as when the open end of the air spring sleeve is crimped to the thin wall body of a composite suspension system utilizing an internal hydraulic or pneumatic shock absorber. The relatively thin wall of the metal member surrounding the internal shock absorber cannot withstand the large crimping force which is usually applied to the clamp ring or clamp member of existing air springs. In these prior clamp assemblies, the force applied against the intervening rubber located between the member being clamped to and the clamping ring, is usually applied uniformly to the rubber sleeve to provide a sufficient gripping force to withstand the internal pressures on the air spring, or the force is concentrated at areas usually located between the apex of a radially extending projection and the aligned bottom of a concave recess.

Therefore, the need exists for an improved clamp assembly for use with air springs, especially when clamping the open end of the elastomeric sleeve against a relatively thin metal member, which does not sacrifice the holding power of the clamp assembly, and which enables the internal pressure in the elastomeric sleeve to be maintained without damaging or distorting the metal member.

SUMMARY OF THE INVENTION

Objectives of the invention include providing an improved clamp assembly for air springs in which the flexible elastomeric sleeve of the air spring is crimped between a clamping member and another member of an air spring or suspension system, and in particular, in which the said other member is formed of a relatively thin wall metal, without crushing the thin wall metal member, yet forming a sufficiently fluid tight seal therebetween to withstand the internal pressure within the elastomeric sleeve.

A still further objective of the invention is to provide such a clamp assembly in which the clamping member includes an end locking portion which prevents the clamping member from slipping past the thin wall metal member or other component of the suspension system to which the elastomeric sleeve is crimped, thereby enabling a reduced crimping force to be used without reducing the forces able to be withstood by the clamp assembly.

Another objective of the invention is to provide such a clamp assembly in which the clamp member is provided with a radially extending convex projection which radially aligns with a concave recess formed in the other member against which the clamp member is crimped, wherein the concave recess has an axial length at least equal to or greater than the axial length of the convex projection, but not as deep as the height of the convex projection, thereby providing a pair of pinch areas on opposite sides of the radially aligned centers of the concave recess and convex projections, thereby providing increased holding power by the clamp assembly without excess crushing pressure being applied to the metal member against which the clamped member is compressed, Another objective of the invention is to provide such a clamp assembly in which the convex projection formed on the clamp member has a radius of curvature which is greater than the radius of curvature of the concave recess by an amount less than the thickness of the elastomeric sleeve being crimped therebetween, and in which the concave recess extends throughout an axial length which is greater than the axial length of the convex projection by an amount also less than the thickness of the elastomeric sleeve.

These objectives and advantages are obtained by the improved clamp assembly of the invention, the general nature of which may be stated as a clamp assembly for clamping an elastomeric sleeve at an open end thereof, to an annular sealing surface of a metal member, including a continuous annular clamp member located concentrically about the annular sealing surface of the metal member, said clamp member having an axially extending clamping surface formed with at least one radially inwardly extending convex projection; at least one concave recess formed on the annular sealing surface of the metal member which radially aligns with the said one convex projection of the clamp member forming a clamp zone therebetween; said convex projection having a substantially continuous radius of curvature R1 extending throughout an axial length L1, and said concave recess having a substantially continuous radius of curvature R2 extending throughout an axial length L2, with L2 being equal to or slightly greater than L1 by an amount less than the thickness of the elastomeric sleeve, and R1 being greater than R2 by an amount less than the thickness of said sleeve, thereby forming two axially spaced-apart pinch areas each on an opposite side of an imaginary radial centerline of said clamp zone.

BRIEF DESCRIPTION OF THE DRAWINGS

Preferred embodiments of the invention illustrative of the best modes in which applicant has contemplated applying the principles, are set forth in the following description and are shown in the drawings and are particularly and distinctly pointed out and set forth in the appended claims.

Similar numerals refer to similar parts throughout the drawings.

DESCRIPTION OF THE PREFERRED EMBODIMENTS

Figure 1:
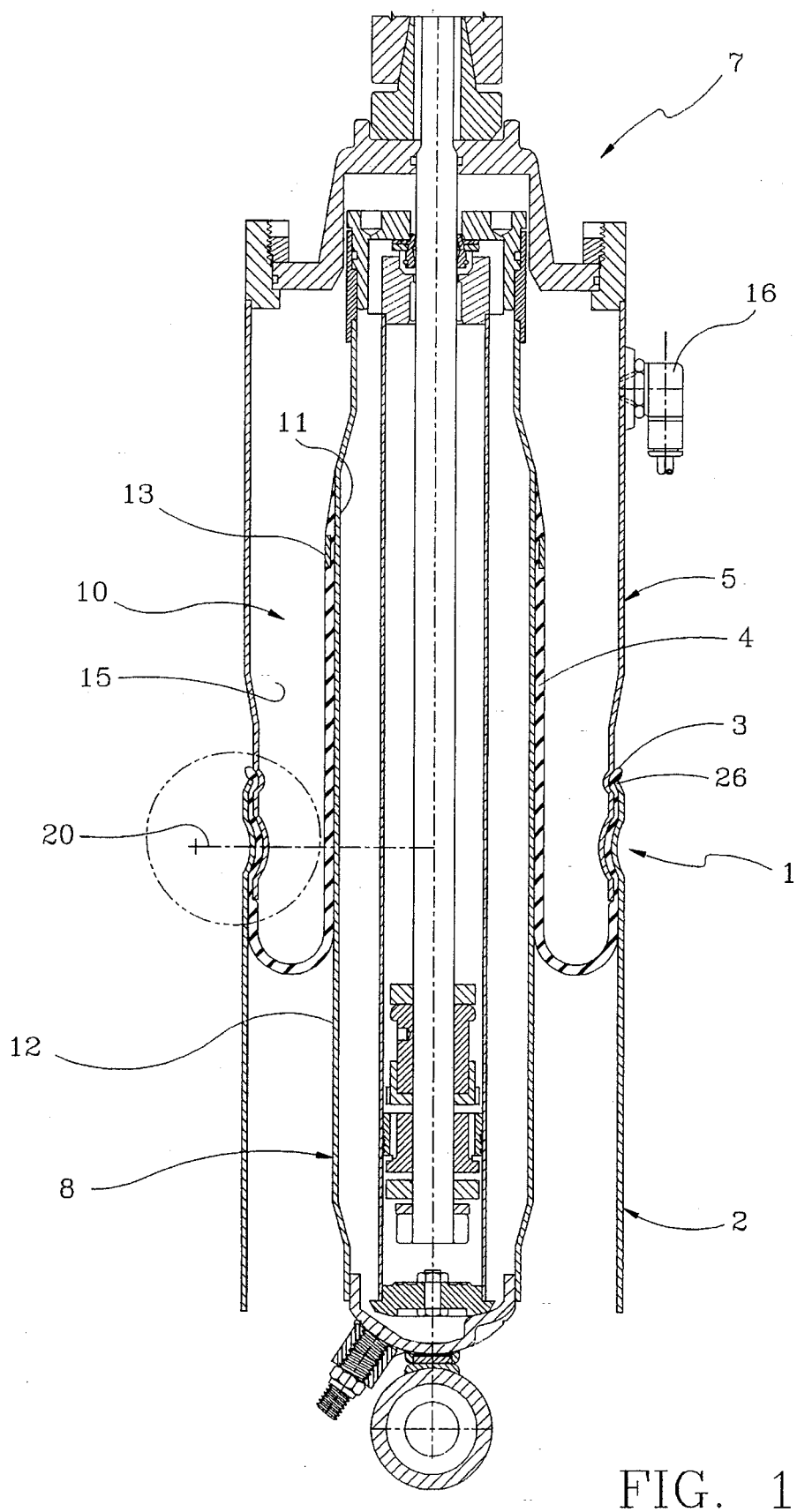
FIG. 1 is a longitudinal sectional view showing the improved clamp assembly of the invention incorporated into a dust tube of a suspension system utilizing an air spring in combination with an internal shock absorber.
Figure 2:
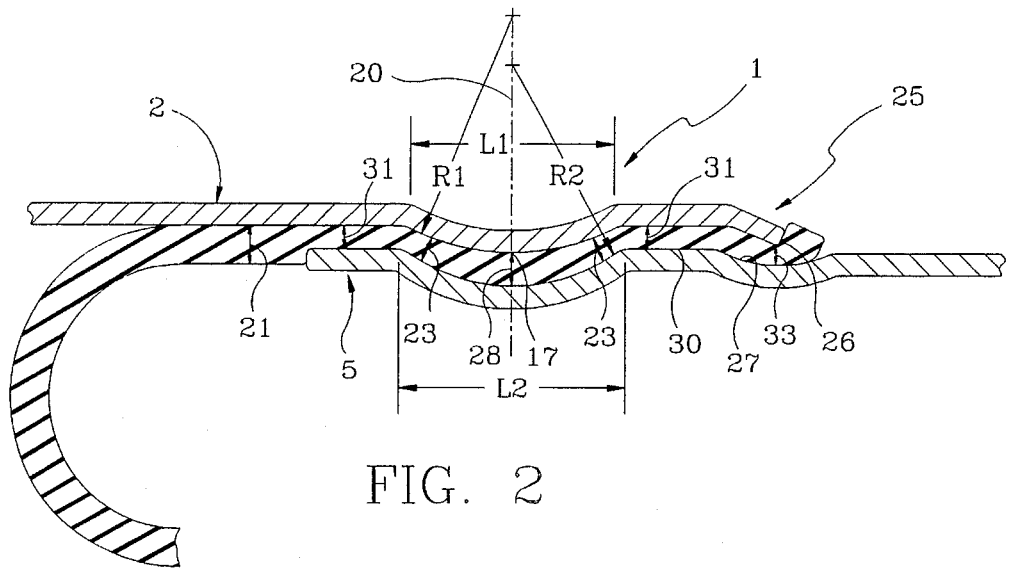
FIG. 2 is a greatly enlarged fragmentary sectional view of the circled portion of FIG. 1.
Figure 3:
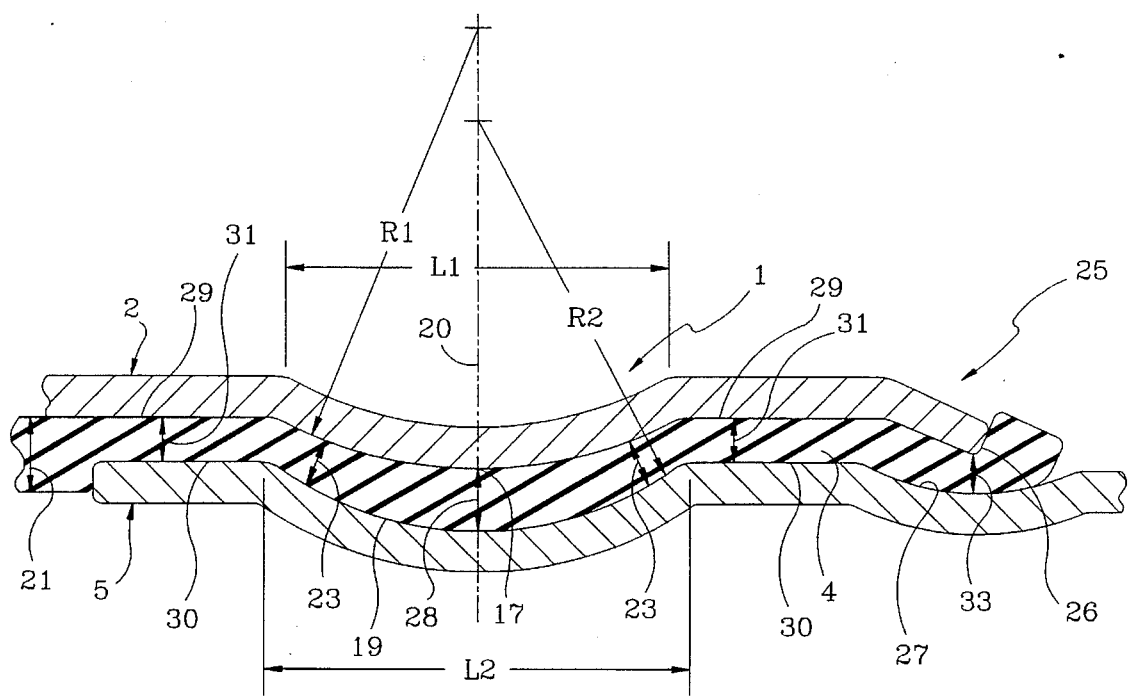
FIG. 3 is a further enlarged fragmentary sectional view of a portion of FIG. 2.

The improved clamp assembly of the invention is shown in a first embodiment in FIGS. 1, 2 and 3. The clamp assembly, which is indicated generally at 1, is formed in an end of a usual cylindrical dust tube 2 for clamping an open end 3 of an elastomeric sleeve 4 against the annular metal body 5 of a suspension system, indicated generally at 7, which incorporates an internal shock absorber 8. Shock absorber 8 is a usual pneumatic or hydraulic shock absorber of a standard construction, and therefore is not described in detail.

The air spring indicated generally at 10, is formed about shock absorber 8. Elastomeric sleeve 4 has another open end 11 clamped against an annular metal body 12 of shock absorber 8 by another clamp ring 13. This provides an air pressure chamber 15 which is supplied with a supply of pressurized fluid, usually air, through a usual coupler 16.

The details of a first embodiment of improved clamp assembly 1 are shown particularly in FIGS. 2 and 3. In accordance with the invention, a convex projection 17 is formed in an axially extending sealing surface of dust tube 2 and has a generally continuous smooth arcuate configuration which extends throughout an axial length L1, and has a radius of curvature R1. In further accordance with the invention, a concave recess 19 is formed in an axially extending sealing surface of metal body 5, and also has a smooth continuous radius of curvature with a radius R2, which extends throughout an axial length L2, forming a clamp zone with convex projection 17. The centers of convex projection 17 and recess 19 lie on an imaginary radial line 20 which passes through the apex of projection 17 and recess 19.

In accordance with another feature of the invention, R1 is greater than R2 by an amount less than the thickness of elastomeric sleeve 4, indicated at 21 (FIG. 3), when the sleeve is in an uncompressed condition. Likewise, L2 is equal to or greater than L1 by an amount less than the sleeve thickness 21. This results in the depth of recess 19 being less than the height of projection 17, thereby resulting in two spaced-apart pinch areas, indicated by arrows 23, which pinch areas are formed on opposite sides of radial centerline 20. This relationship is in contrast to the pinch area or pinch zone formed by prior art clamp assemblies for air springs wherein the maximum point of pinching or squeezing of the elastomeric sleeve is either at the center of the clamp between the apex of the projection and the bottom surface of the concave recess, as indicated by arrow 28 in FIG. 3, or is uniform throughout the entire pinch zone.

However, in accordance with the feature of the present invention, the relationship between the convex projection and the concave recess provides for the two distinct axially spaced-apart pinch areas. Thus, in this arrangement the rubber is squeezed outwardly so that the crimp load does not act directly to crush member 5 against which the elastomeric sleeve is being crimped by clamp assembly 1.

In further accordance with the invention, clamp assembly 1 includes an end locking feature, indicated generally at 25 (FIG. 3), wherein an annular terminal end 26 of dust tube 2 is bent inwardly toward another concave recess 27 spaced axially from concave recess 19. In the preferred embodiment, terminal end 26 extends at an angle of approximately 45° towards recess 27 so that the spacing therebetween, indicated by arrow 33, is approximately 30% of the thickness 21 of elastomeric sleeve 4. This places a severe squeeze on the sleeve in this area, and in severe loading conditions, may even be closer to metal body 5. However, end 26 prevents member 2 from slipping axially with respect to body 5 and, when combined with the spaced pinch areas provided by projection 17 and recess 19, provides the necessary holding power for air spring 10 of suspension system 7 without crushing the relatively thin metal wall of body 5.

Heretofore, prior art clamp assemblies would squeeze a crimp ring to the point of crushing the member being crimped to, for example, metal body 5, in order to achieve the desired holding force, requiring metal 5 to be of a thicker material in order to withstand such crushing load. The combination of clamp assembly 1 with end locking feature 25 enables the metal thickness of body 5 to be at a minimum without sacrificing the effectiveness of the clamping force against the intervening elastomeric sleeve of the air spring.

Referring still to FIG. 3, annular or cylindrical wall areas 29 extend axially from convex projection 17 and are parallel to and spaced from corresponding cylindrical wall areas 30 which extend axially from concave recess 19. In the preferred embodiment, the spacing between these parallel wall areas, indicated by arrows 31, is between 50% and 80% of thickness 21 of the elastomeric sleeve. Whereas, in the preferred embodiment of the invention, distance 23 at the two spaced-apart pinch areas is between 30% and 50% of material thickness 21 of elastomeric sleeve 4.

It has been discovered that the particular relationships set forth above and shown particularly in FIG. 3, have provided a clamp assembly for an air spring when used for clamping the open end of an elastomeric sleeve against a metal component, such as the outer metal body 5 of a suspension system, or even if used for clamping the open end of an elastomeric sleeve against an end member or piston of an air spring, provides sufficient holding power without applying excess clamping force against the component to which the elastomeric sleeve is clamped by the clamping member. In the preferred embodiment, the thickness of metal body 5 will typically be in the range of between 0.05 inches and 0.10 inches.

Figure 4:
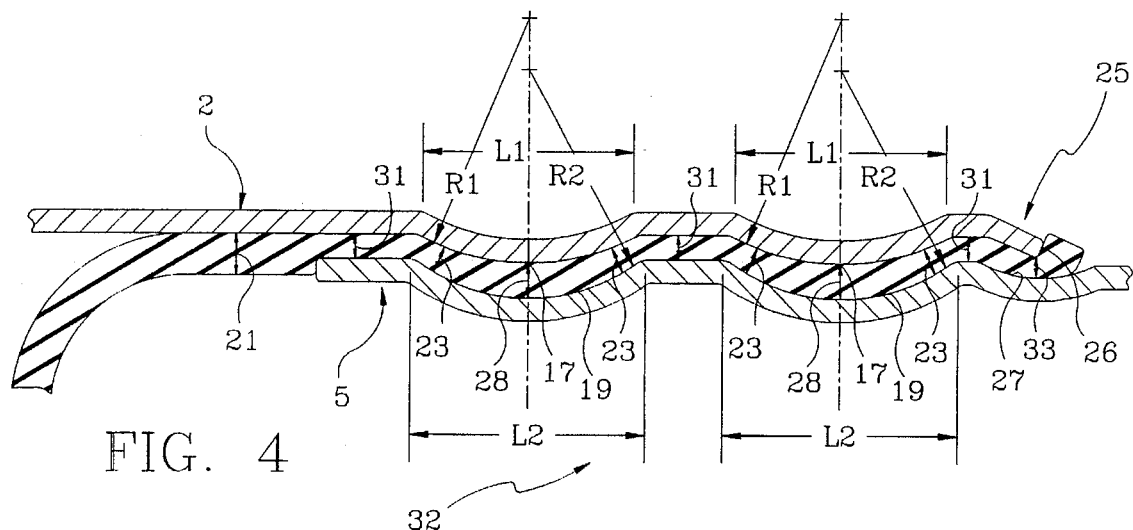
FIG. 4 is a sectional view similar to FIG. 2 of a second embodiment of the clamp assembly.

A modified embodiment of the invention is indicated generally at 32, and is shown particularly in FIG. 4. Embodiment 32 is similar to clamp assembly 1, shown in FIGS. 1–3, with the exception that a pair of mating convex projections 17 and radially aligned concave recesses 19 are provided in an axially spaced relationship along dust tube 2 and outer metal body 5. An end locking member 25 is also provided in the same manner as in clamp assembly 1. This embodiment provides four separate pinch areas 23 instead of the two pinch areas as in assembly 1.

Figure 5:
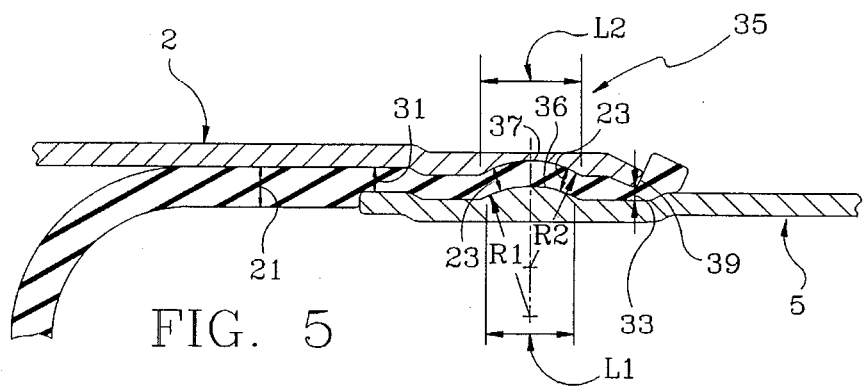
FIG. 5 is a sectional view similar to FIG. 2 of a third embodiment of the clamp assembly.

A third embodiment, indicated generally at 35, is shown in FIG. 5. Embodiment 35 is generally similar to the embodiment shown in FIGS. 1–3 with the differences being that a convex projection 36 is formed on metal body 5, with a concave recess 37 being formed in dust tube 2. The relationship between the arcuate lengths and radii of curvatures are the same as that described previously for the embodiment of FIGS. 1–3, and, therefore, are not repeated. An end locking feature 38 is also provided by the bent end of dust tube 2, which extends within a recessed area 39 formed in metal body 5 axially spaced from convex projection 36°. This third embodiment shows that the mating convex projection and concave recesses can either be on the member forming the clamp member, such as the end portion of dust tube 2, or in the member being clamped against, such as the end of outer metal body 5, without affecting the concept of the invention.

Figure 6:
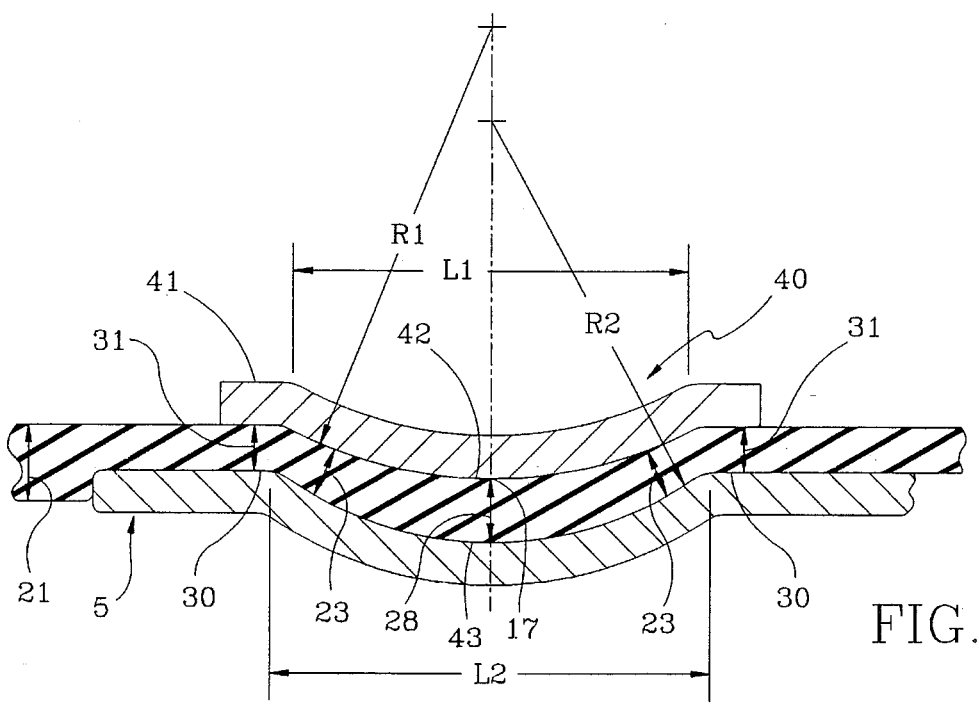
FIG. 6 is a fourth embodiment of the clamp assembly.

A fourth embodiment is indicated generally at 40, and is shown in FIG. 6. In this embodiment, the clamping member is an annular ring 41 which is formed with a convex projection 42 for radial alignment and engagement within a concave recess 43 formed in the clamped-to member. Thus, the clamping member can either be an annular ring, as shown in this fourth embodiment, or can be the end portion or even an intermediate portion, of another metal body, such as shown in the first three embodiments, without affecting the concept of the invention.

Accordingly, the clamp assembly of the present invention is simplified, provides an effective, safe, inexpensive, and efficient device which achieves all the enumerated objectives, provides for eliminating difficulties encountered with prior clamping devices, and solves problems and obtains new results in the art.

In the foregoing description, certain terms have been used for brevity, clearness and understanding; but no unnecessary limitations are to be implied therefrom beyond the requirement of the prior art, because such terms are used for descriptive purposes and are intended to be broadly construed.

Moreover, the description and illustration of the invention is by way of example, and the scope of the invention is not limited to the exact details shown or described.

Having now described the features, discoveries and principles of the invention, the manner in which the improved clamp assembly is constructed and used, the characteristics of the assembly, and the advantageous, new and useful results obtained; the new and useful structures, devices, elements, arrangements, parts and combinations, are set forth in the appended claims.

I claim:

1. An improved clamp assembly for clamping an elastomeric sleeve at an open end thereof to an annular sealing surface of a thin wall metal member, said clamp assembly including:

a continuous annular clamp member located concentrically about the annular sealing surface of the metal member, said clamp member having an axially extending clamping surface formed with at least one radially extending convex projection;

at least one concave recess formed on the annular sealing surface of the metal member which radially aligns with the said one convex projection of the clamp member forming a clamp zone therebetween;

said convex projection having a substantially continuous radius of curvature R1 extending throughout an axial length L1, and said concave recess having a substantially continuous radius of curvature R2 extending throughout an axial length L2, with L2 being equal to or slightly greater than L1 by an amount less than the thickness of the elastomeric sleeve, and R1 being greater than R2 by an amount less than the thickness of said sleeve, thereby forming two axially spaced-apart pinch areas each on an opposite side of an imaginary radial centerline of said clamp zone.

2. The clamp assembly defined in claim 1 in which the annular clamp member includes a terminal end; and in which said terminal end is bent toward the metal member.

3. The clamp assembly defined in claim 1 in which the pinch areas are spaced apart a distance of between 30% and 50% of the thickness of the elastomeric sleeve.

4. The clamp assembly defined in claim 2 in which the metal member is formed with a second annular concave recess spaced axially from said one concave recess; and in which the terminal end of the clamp member extends toward said second concave recess to clamp the elastomeric sleeve therebetween.

5. The clamp assembly defined in claim 4 in which the spacing between the terminal end of the clamp member and a bottom surface of the second concave recess is approximately 30% of the thickness of the elastomeric sleeve.

6. The clamp assembly defined in claim 1 in which a second radially extending convex projection is formed on the clamp member and is spaced axially from the said one convex projection; and in which a second concave recess is formed on the annular sealing surface of the metal member spaced axially from said one concave recess and is in radial alignment with the second convex projection forming a second clamp zone therebetween.

7. The clamp assembly defined in claim 1 in which the clamping member and metal member are each formed with annular axially extending wall areas on opposite ends of the convex projection and concave recess, respectively; and in which said annular wall areas of the clamping member are parallel with and spaced from the annular wall areas of the end member.

8. The clamp assembly defined in claim 7 in which the annular wall areas of the end member are spaced from the annular wall areas of the clamping member a distance of between 50% and 80% of the thickness of the elastomeric sleeve.

9. The clamp assembly defined in claim 1 in which the thickness of the metal member is between 0.05 inches and 0.10 inches.

10. A suspension device containing an air spring including an elastomeric sleeve having at least one open end, an end member, and a clamping member for sealingly clamping said open end of the sleeve on said end member; an annular concave recess formed on either the end member or the clamping member having a center of concavity in radial alignment with a center of a convex projection formed on the other of the end member or the clamping member; and said concave recess having an axial length at least equal to or greater than the axial length of said convex projection but not as deep as the height of said convex projection providing a pair of pinch areas on opposite sides of the centers of said recess and convex projection, the convex projection having a radius of curvature R1 and the concave recess having a radius of curvature R2, with R1 being greater than R2 by an amount less than the thickness of the elastomeric sleeve.

11. The air spring defined in claim 10 in which the convex projection has a substantially continuous radius of curvature extending throughout an axial length L1, and the concave recess has a substantially continuous radius of curvature extending throughout an axial length L2; and in which L2 is greater than L1 by an amount less than the thickness of the elastomeric sleeve.

12. The air spring defined in claim 10 in which the clamping member terminates in an inclined terminal end; in which an annular concave locking recess is formed on the end member; and in which said terminal end of the clamping member extends into said locking recess to squeeze the elastomeric sleeve therebetween.

13. The air spring defined in claim 12 in which a spacing between the terminal end of the clamping member and a bottom surface of the locking recess is approximately 30% of the thickness of the elastomeric sleeve.

14. The air spring defined in claim 10 in which the spacing between the clamping member and end member at the pinch areas is generally between 30% and 50% of the thickness of the elastomeric sleeve.

15. The air spring defined in claim 10 in which the clamping member and end member are each formed with annular axially extending wall areas on opposite ends of the convex projection and concave recess, respectively; and in which the annular wall areas of the clamping member are parallel with and spaced from the annular wall areas of the end member.

16. The air spring defined in claim 15 in which the annular wall areas of the end member are spaced from the annular wall areas of the clamping member a distance of between 50% and 80% of the thickness of the elastomeric sleeve.

* * * * *